US006803523B2

(12) United States Patent
Yuasa et al.

(10) Patent No.: US 6,803,523 B2
(45) Date of Patent: Oct. 12, 2004

(54) ELECTRICAL CONDUCTOR ASSEMBLY

(75) Inventors: Eriko Yuasa, Mie (JP); Shuji Yamakawa, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 10/651,276

(22) Filed: Aug. 28, 2003

(65) Prior Publication Data

US 2004/0040733 A1 Mar. 4, 2004

(30) Foreign Application Priority Data

Sep. 4, 2002 (JP) ....................................... 2002-258845

(51) Int. Cl.[7] .................................................. H02G 5/00

(52) U.S. Cl. .................. 174/88 R; 174/88 B; 439/76.2

(58) Field of Search ............................ 174/88 R, 88 B, 174/68.1, 84 C, 50.52, 50.53; 439/76.2, 74, 891, 949

(56) References Cited

U.S. PATENT DOCUMENTS 6,402,530 B1 * 6/2002 Saito et al. ................ 439/76.2
6,540,543 B1 * 4/2003 Watanabe ................... 439/354
6,672,883 B2 * 1/2004 Kasai et al. ............... 439/76.2
6,723,924 B2 * 4/2004 Yuasa et al. ............... 174/68.2

* cited by examiner

*Primary Examiner*—Chau N. Nguyen
(74) *Attorney, Agent, or Firm*—Harness, Dickey & Pierce, P.L.C.

(57) ABSTRACT

An electrical conductor assembly contained in an electrical connection box to be mounted on an automobile has a bus bar produced by punching an aluminum-based metal plate into a desired circuit configuration. The bus bar includes an end with a tab formed by bending the end. An intermediate terminal is to be coupled to the tab. The intermediate terminal includes a rectangular parallelepiped box. The box has openings in its opposite ends. The box is made of an iron-based metal plate having an elastic function. A pair of terminal plates oppose each other in the box. Each of the pair of terminal plates, on upper and lower positions, has arcuately bent contact portions. Spring portions are on each of opposed peripheral walls of the rectangular parallelepiped box. The spring portions contact rear surfaces of the contact portions. The tab of the bus bar is inserted into an end opening in the intermediate terminal. The tab is forcedly inserted between the contact portions on one side of the terminal plates.

3 Claims, 6 Drawing Sheets

ELECTRICAL CONDUCTOR ASSEMBLY

CROSS-REFERENCE TO RELATED APPLICATIONS

The entire disclosure of Japanese Patent Application No. 2002-258845 filed on Sep. 4, 2002 including the specification, claims, drawings and summary is incorporated herein by reference in its entirety.

FIELD OF THE INVENTION

The present invention relates to an electrical conductor assembly contained in an electrical connection box, such as a junction box mounted on an automobile, and more particularly to an electrical conductor assembly where a bus bar and an intermediate terminal to be connected to the bus bar are made of recyclable material.

BACKGROUND OF THE INVENTION

Bus bars produced by punching an electrical conductive metal plate are contained in electrical connection boxes such as a junction box to form an internal circuit. A tab is formed by bending an end of the bus bar. The tab is connected, through an intermediate terminal, to a relay terminal, a fuse, or a connector mounted in the electrical connection box.

For convenience of explanation, a conventional electrical conductor assembly will be described by referring to FIGS. 5 to 7. FIG. 5 is an exploded perspective view of a conventional electrical connection box for an automobile. FIG. 6 is a perspective view of a conventional intermediate terminal. FIG. 7 is an explanatory view illustrating a problem caused in the conventional intermediate terminal.

More particularly, as shown in FIG. 5, an electrical connection box 1 includes a casing with an upper casing member 2 and a lower casing member 5. Bus bars 4 and insulation plates 3 are laminated alternately on each other in the casing. An end of each bus bar 4 is bent to form a tab 4*a*. The tabs 4*a* of the bus bar 4 are connected to intermediate terminals 6.

The tabs 4*a* penetrate a connector containing section 2*a* in the upper casing member 2 (and/or lower casing member 5), a fuse containing section 2*b*, and a relay containing section 2*c*. The tabs 4*a* of the bus bars 4 are connected to terminals T of a connector C coupled to a wire harness W/H, a fuse F, and a relay R through the intermediate terminals 6.

Heretofore, the bus bars 4 and intermediate terminals 6, which constitutes the internal circuits, were formed by punching and then bending a copper-based metal plate having a high electrical conductivity. For example, as shown in FIG. 6, the punched copper-based metal plate is bent into tube-like bodies to define slits between the opposed side ends. Thus, each intermediate terminal 6 has upper and lower arcuate contact portions 6*a* and 6*b*. The tab 4*a* of the bus bar 4 is pushed into the lower contact portion 6*b* through a lower opening in the intermediate terminal 6. The terminal T of the relay R or the like is pushed into the upper contact portion 6*a* through an upper opening in the intermediate terminal 6. Consequently, the relay R is electrically coupled through the intermediate terminal 6 to the bus bar 1. Alternatively, a pair of tabs of the bus bar, connected to the respective terminals T, may be pushed into the upper and lower contact portions 6*a* and 6*b* of the intermediate terminal 6.

Recently, requirement necessitate enhanced recyclability of junked automobiles. Iron makes up the largest part of an automobile. When the junked automobile is thrown into an incinerator to recover and recycle iron, it is required that a mixing rate of copper to iron should be less than 0.1%. This prevents the iron from being denatured due to a reaction with copper.

Since the bus bars 4 are made of a copper-based metal plate, as described above, it is preferable to remove the bus bars 4 from the car body upon disassembly of the automobile and to separate the bus bars 4 from the car body made of an iron-based metal. However, the electrical connection box must be disassembled in order to remove the bus bars 4 from the electrical connection box 1. This work requires intense manpower and is not a practical matter.

To avoid interference with the recovery of iron as a practical matter from a recycling standpoint, it is desirable to select the bus bar 4 from an aluminum-based metal that will not denatured the reaction with the iron. In addition, the aluminum-based metal has an advantage of providing good workability as well as being lightweight.

However, there is a problem in the following case. In the case where the bus bar 4 is made of an aluminum-based metal plate and the intermediate terminal 6 is made of a copper-based metal plate, electric erosion is caused between the different kinds of metals. Accordingly, if the bus bar 4 is made of the aluminum-based metal plate, it is preferable to make the intermediate terminal 6 from the aluminum-based metal plate. However, in this case where the intermediate terminal is made of the aluminum-based metal, since the aluminum-based metal has no elastic function, a desired contact pressure cannot be obtained between the intermediate terminal and the tab. Thus, reliability of the electrical connection is lowered.

The conventional intermediate terminal 6 shown in FIG. 6 is made of the copper-based metal plate having an elastic function. The arcuate contact portions 6*a* and 6*b* exhibit the elastic function and can exert a desired contact pressure between the intermediate terminal and the tab. In FIG. 7, a similar intermediate terminal 6' is made of the aluminum-based metal plate. Contact portions 6*a*' and 6*b*' remain in their deformed positions and do not return to their original positions when the tab of the bus bar or the relay terminal T or the like is pushed into the contact portions 6*a*' and 6*b*'. This is due to the aluminum-based metal plates lack of an elastic function. Thus, the desired contact pressure cannot be obtained.

In view of the above problems, it is an object of the present invention to provide an electrical conductor assembly where a bus bar and an intermediate terminal are made of an aluminum-based metal plate. This enhances the recyclability of the automobile and obtains the desired contact pressure between the intermediate terminal and the tab formed on the bus bar. Thus, enhanced reliability of the electrical connection is achieved.

Still other objects and advantages of the invention will become apparent after viewing of the present specification.

SUMMARY OF THE INVENTION

In order to overcome the above problems, the present invention provides an electrical conductor assembly contained in an electrical connection box to be mounted on an automobile. The electrical conductor assembly comprises a bus bar produced by punching an aluminum-based metal plate into a desired circuit configuration. The bus bar is provided on an end with a tab formed by bending the end. An intermediate terminal is adapted to be coupled to the tab. The intermediate terminal includes a rectangular parallelepiped box having openings in the opposite ends. The intermediate terminal is made of an iron-based metal plate having an elastic function. A pair of terminal plates oppose each other in the box. Each of the pair of terminal plates is provided on upper and lower positions with arcuately bent contact portions. The rectangular parallelepiped box is provided on each of opposed peripheral walls. A spring portion is in the parallelepiped box. The spring portion comes into contact with a rear surface of each contact portion. The tab of the bus bar is inserted into an end opening in the intermediate terminal. Thus, the tab is forcedly inserted between the contact portions on one side of the terminal plates.

It is preferable that the above box has a high elastic function and stiffness. The box is produced by bending a stainless steel plate. The box does not cause electric erosions even if the box comes into contact with a terminal plate made of an aluminum-based metal plate.

In order to incorporate the pair of terminal plates into the box, each of the pair of terminal plates is provided on each of upper and lower ends with a hook-like latch portion. The hook-like latch portion is hooked on each of upper and lower end edges of the box to attach the terminal plate to the box.

The present invention is not limited to the above coupling construction between the box and the terminal plates. The present invention can utilize various kinds of coupling such as a convexo-concave fitting.

According to the construction of the electrical conductor assembly, in the electrical connection box to be mounted on an automobile, the bus bar is made of an aluminum-based metal instead of a copper-based metal. The mixing rate of copper to iron can be reduced which has caused problems with the recovery of iron during recycling of car bodies in the prior art. Also, since the terminal plates of the intermediate terminal, which contact the aluminum-based press contact tab of the bus bar, are made of aluminum-based metal plate it is possible to prevent the press contact portions from suffering from electric erosions.

The intermediate terminal is made of the aluminum-based metal plate having no elastic function. However, the spring pieces of the box, made from stainless steel having an elastic function, push the press contact portions of the terminal plates to give the elastic function to the terminal plates. Accordingly, it is possible to bring the tab of the bus bar into contact with the terminal plates of the intermediate terminal with a desired contact pressure.

BRIEF DESCRIPTION OF THE DRAWINGS

The figures are for illustration purposes only and are not drawn to scale. The invention itself, however, both as to organization and method of operation, may best be understood by reference to the detailed description, which follows taken in conjunction with the accompanying drawings in which.

DETAILED DESCRIPTION OF THE PREFERRED EMBODIMENTS

Figure 1:
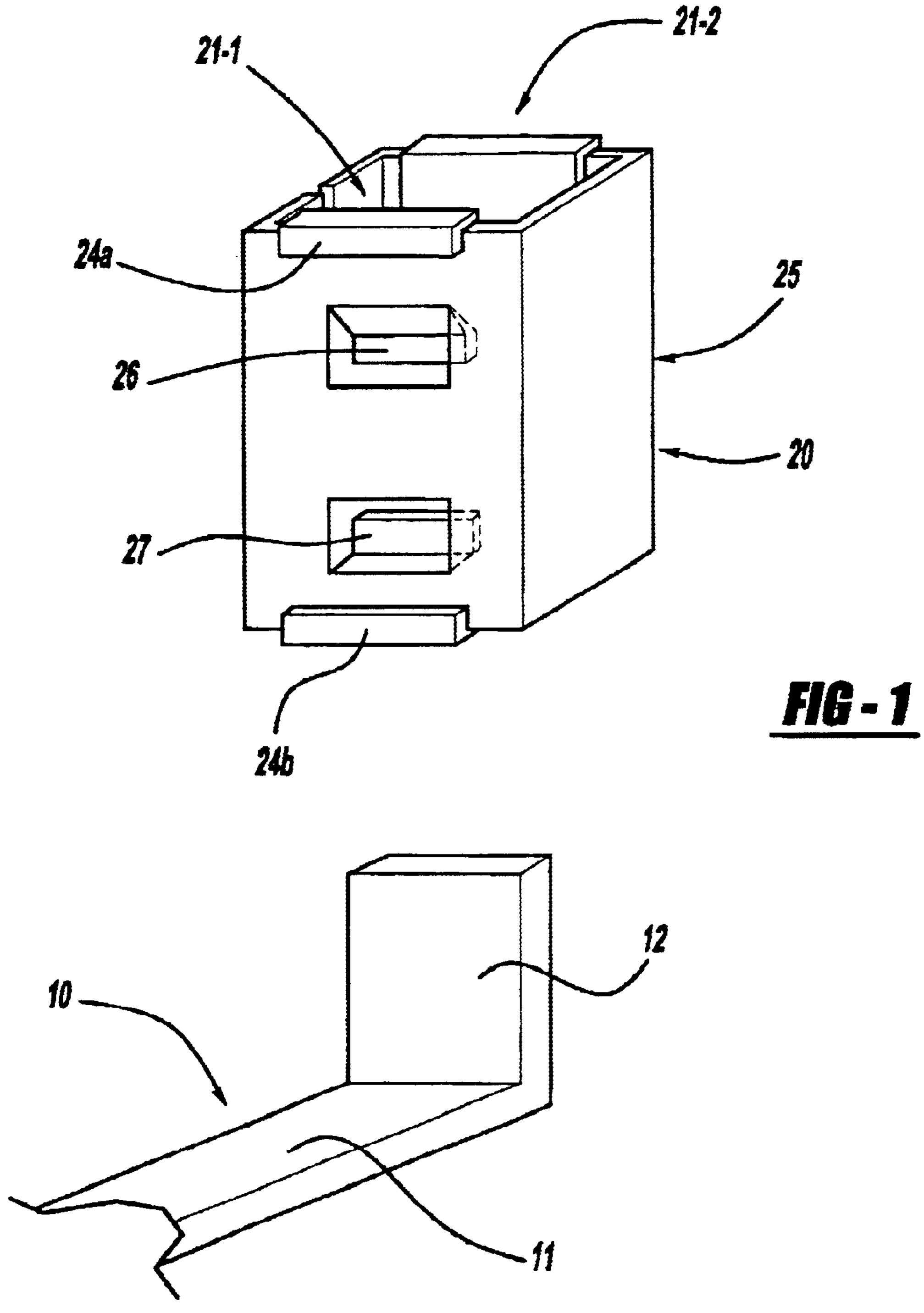
FIG. 1 is an exploded perspective view of a first embodiment of an electrical conductor assembly including bus bars and an intermediate terminal in accordance with the present invention.

In describing the preferred embodiment of the present invention, reference will be made to FIGS. 1 to 4 of the drawings in which like numerals refer to like features of the invention. Features of the invention are not necessarily shown to scale in the drawings. Embodiments of an electrical conductor assembly in accordance with the present invention will be described below by referring to the drawings.

As shown in FIG. 1, an electrical conductor assembly includes a bus bar 10 and an intermediate terminal 20. The bus bar 10 and intermediate terminal 20 are contained in an electrical connection box 1 for an automobile shown in FIG. 5 to form an internal circuit.

Figure 5:
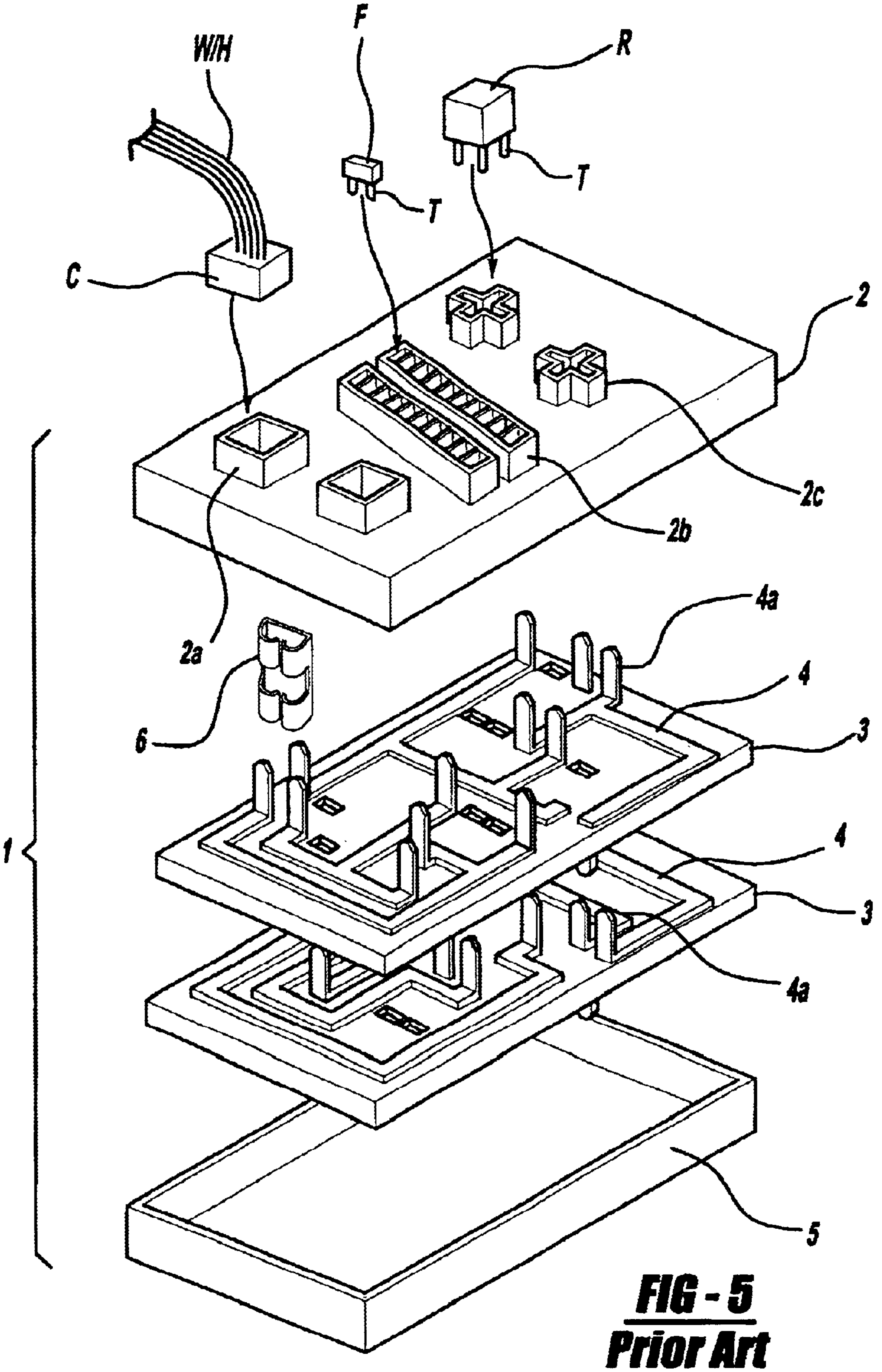
FIG - 5 Prior Art
FIG. 5 is an exploded perspective view of a conventional electrical connection box for an automobile.
Figure 6:
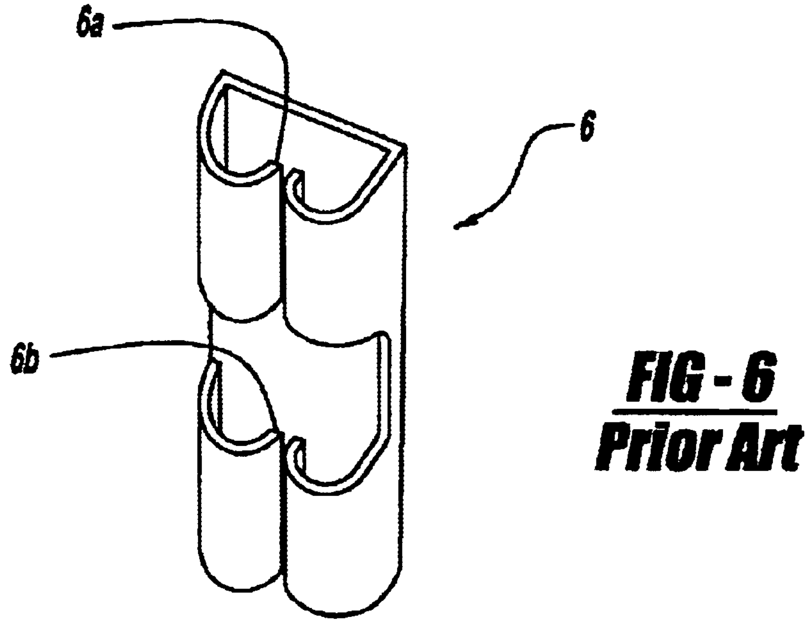
FIG - 6 Prior Art
FIG. 6 is a perspective view of a conventional intermediate terminal.
Figure 7:
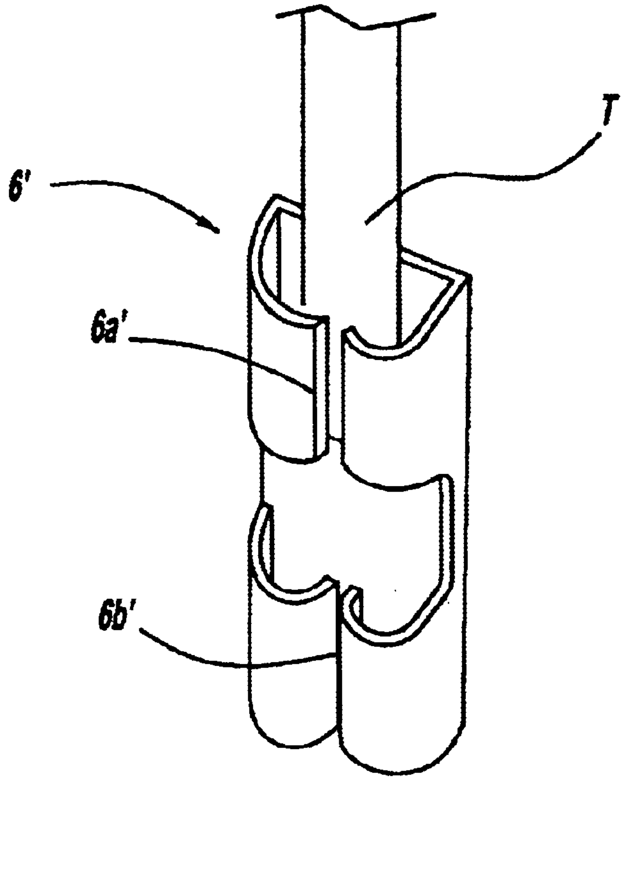
FIG - 7 Prior Art
FIG. 7 is an explanatory view illustrating a problem in the conventional intermediate terminal.

As shown in FIG. 1, an electrical conductor assembly includes a bus bar 10 and an intermediate terminal 20 and is contained in an electrical connection box 1 for an automobile, shown in FIG. 5, to form an internal circuit.

The bus bar 10 is produced by punching an aluminum-based metal plate into a desired flat plate-like circuit configuration. An end of the bus bar is bent to form a tab 12. The bus bar 10 may be made of pure aluminum or an aluminum alloy, such as Al—Mg, Al—Mn, Al—Mg—Si, Al—Zn—Mg, or Al—Si. Conductivity of pure aluminum is 60% of that of copper while conductivity of an aluminum alloy is 30% of copper. It will be preferable to use pure aluminum from a conductivity viewpoint.

The intermediate terminal 20 is connected to the tab 12 of the bus bar 10. The intermediate terminal 20 includes a rectangular parallelepiped box 25 and a pair of terminal plates 21 (21-1, 21-2). The box 25 has openings at its opposite ends. The box 25 is produced by bending and folding a stainless steel plate with an elastic function. The pair of terminal plates 21 (21-1, 21-2) are incorporated in the box 25 and are made of an aluminum-based metal plate.

Figure 2:
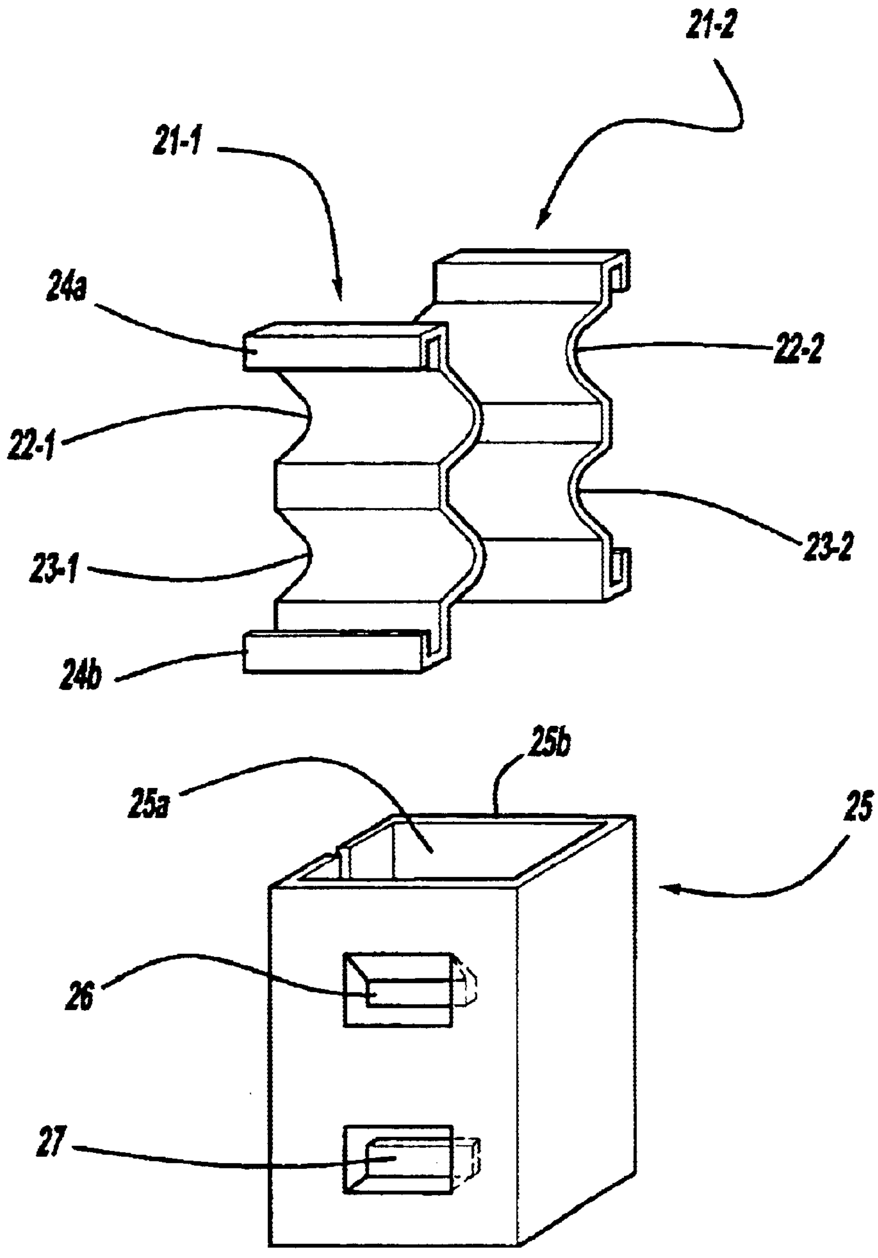
FIG. 2 is an exploded perspective view of the electrical conductor assembly including a box and terminal plates in the intermediate terminal.

As shown in FIG. 2, the pair of terminal plates 21 have the same configuration. Each terminal plate 21 includes an upper contact portion 22 (22-1, 22-2) and a lower contact portion 23 (23-1, 23-2). The contact portion 22, 23 are formed by bending an elongated aluminum-based metal plate into two arcuate shapes at the upper and lower positions. The terminal plate 21 is provided on upper and lower ends with hook-like latch portions **24*a* and 24*b***.

The rectangular parallelepiped box 25 is made from stainless steel plate. The upper and lower portions of opposite peripheral walls **25*a* and 25*b* on the box 25 have U-shaped slits. Spring pieces 26 and 27 are inclined and projected from the slits inwardly in the box 25**.

Figure 3:
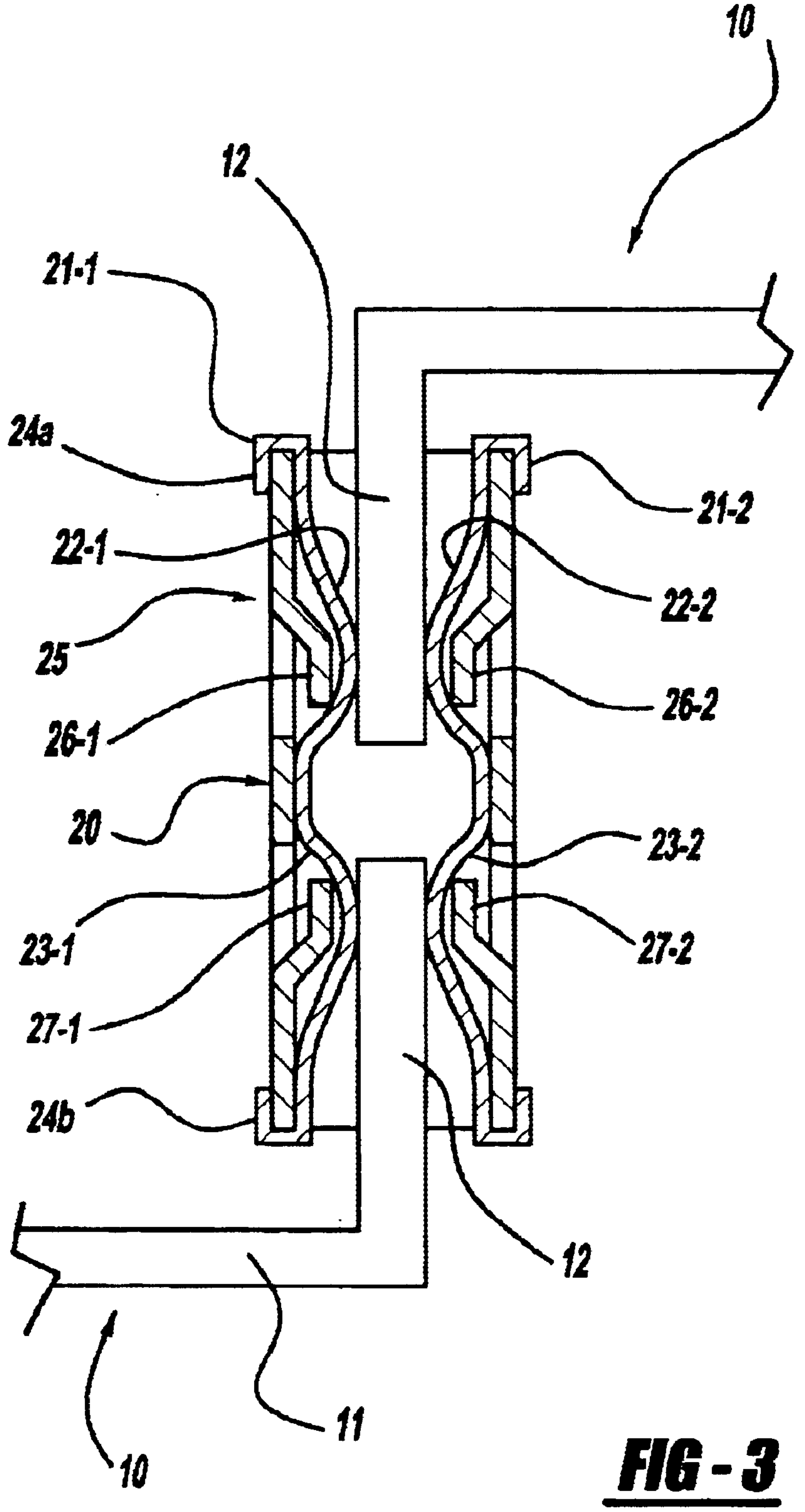
FIG. 3 is a sectional view of the electrical conductor assembly, illustrating a position interconnecting tabs of the bus bars through the intermediate terminal.

The pair of terminal plates 21-1 and 21-2 symmetrically oppose each other and are incorporated into the box 25. The respective contact portions 22-1 and 23-1 of the left terminal plate 21-1 are arranged in the vicinity of the respective contact portions 22-2 and 23-2 of the right terminal plate 21-2, as shown in FIG. 3. At this time, the latch portions **24*a* and 24*b* on the opposite longitudinal ends of the respective terminal plates 21-1 and 21-2 are hooked on the upper and lower end edges of the peripheral walls 25*a* and 25*b* of the box 25**.

The pair of terminal plates 21 are contained in and are engaged with the box 25 under the above condition. The spring pieces 26 and 27, projecting inwardly in the box 25, engage the rear sides of the contact portions 22 and 23 to bias them inwardly in the box 25. Consequently, the opposed contact portions 22-1, 22-2 and 23-1, 23-2 are biased by the spring pieces 26 (26-1, 26-2) and 27 (27-1, 27-2) to approach each other.

The tab 12 of the bus bar 10 is pushed into a lower opening in the intermediate terminal 20 including the box 25 and terminals 21. The tab 12 is inserted into a space between a pair of terminal plates 21-1 and 21-2 and is clamped between the lower contact portions 23-1 and 23-2. When the tab 12 is inserted into the space between the lower contact portions 23-1 and 23-2, the lower contact portions 23-1, 23-2 are deformed outwardly in the box 25. The terminal 21 itself has no elastic recovery force. This is due to the fact that the terminal 21 is made of the aluminum-based metal plate. However, since the spring pieces 27-1 and 27-2 of the box 25 push the rear sides of the contact portions 23-1 and 23-2, the contact portions 23-1 and 23-2 return toward their original positions. Thus, the contact portions 23-1, 23-2 clamp the tab 12 in an elastic manner.

The spring pieces 27 of the box 25 are made from the stainless steel plate. The spring pieces 27 have an elastic function and push the terminal plate, made of the aluminum-based metal plate, which has no elastic function. The terminal plate can have an elastic function and apply a desired contact pressure between the tab 12 and the contact portions of the intermediate terminal 20. This enhances the reliability of the electrical connection.

Figure 4:
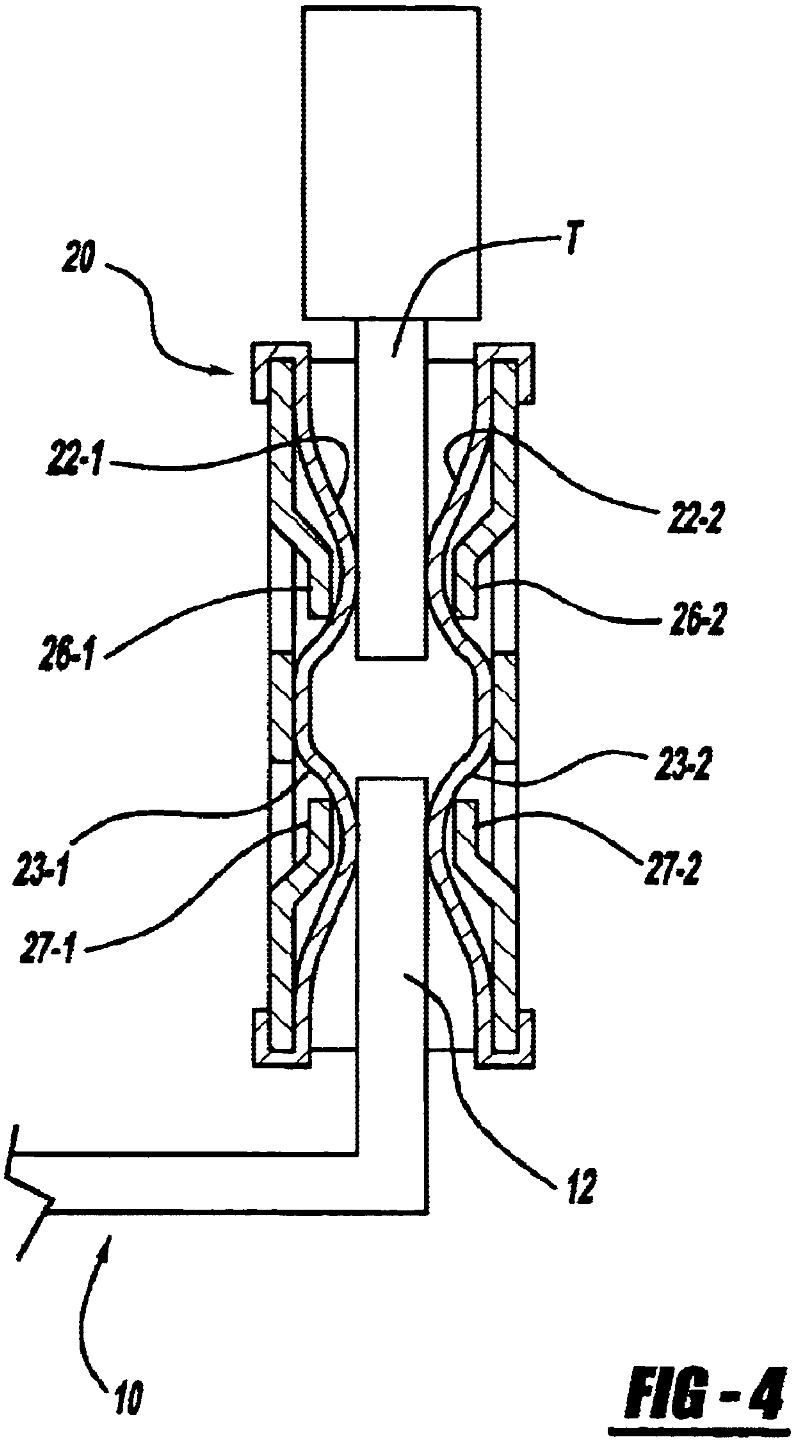
FIG. 4 is a sectional view of the electrical conductor assembly, illustrating a position interconnecting a tab of the bus bar and a terminal of a relay through the intermediate terminal.

As shown in FIG. 3, a tab 12 of another bus bar 10 is inserted into an upper opening in the intermediate terminal 20. The tab 12 is clamped between the contact portions 22-1 and 22-2. Thus, it is possible to obtain a desired contact pressure, since the spring pieces 26-1 and 26-2 of the box 25 push the rear sides of the contact portions 22-1 and 22-2. In the case where a relay terminal T, a fuse, or a connector mounted in the electrical connection box is inserted into the upper opening in the intermediate terminal 20, as shown in FIG. 4, similar desired contact pressure can be obtained.

The bus bars 10 and the terminal plates 21 of the intermediate terminal 20 are made of the aluminum-based metal. The mixing rate of copper to iron, which has an adverse effect upon iron recovery during recycling of car bodies in the prior art, is reduced. It is also possible to enhance recyclability for a junked automobile. Also, since the aluminum does not denature the iron-based metal, due to reaction on the iron-based metal of the car body, it is possible to enhance recovery of iron. Furthermore, since the box 25 of the intermediate terminal 20 is made from stainless steel, it is possible to enhance recyclability.

In addition, since the tab 12 of the bus bar 10 and the terminal plates 21 of the intermediate terminal 20 are made of the aluminum-based metal, they have rust-resistance characteristics, good workability and add to the lightweightness of the electrical connection box.

The present invention is not limited to the above embodiments. The spring pieces of the box for biasing the contact portions may be formed into the same arcuate shapes as those of the contact portions of the terminal plates and may engage front sides of the contact portions.

While the present invention has been particularly described, in conjunction with a specific preferred embodiment, it is evident that many alternatives, modifications, and variations will be apparent to those skilled in the art in light of the foregoing description. It is therefore contemplated that the appended claims will embrace any such alternatives, modifications, and variations as falling within the true scope and spirit of the present invention.

What is claimed is:

1. An electrical conductor assembly adapted to be contained in an electrical connection box to be mounted on an automobile, comprising:

a bus bar produced by punching an aluminum-based metal plate into a desired circuit configuration, said bus bar including an end with a tab formed by bending said end; and an intermediate terminal adapted to be coupled to said tab;

said intermediate terminal including a rectangular parallelepiped box having openings in opposite ends and made of an iron-based metal plate having an elastic function, a pair of terminal plates made of an aluminum-based metal plate and opposing each other are positioned in said box, each of said pair of terminal plates including arcuately bent contact portions on upper and lower positions of said terminal plates, and spring portions on each of opposed peripheral walls of said rectangular parallelepiped box, said spring portions contacting rear surfaces of said contact portions;

said tab of said bus bar being inserted into one of said openings in said intermediate terminal so that said tab is forcedly inserted between said contact portions on one side of said terminal plates.

2. An electrical conductor assembly according to claim 1, wherein said box is formed by bending a stainless steel plate.

3. An electrical conductor assembly according to claim 1, wherein each of said pair of terminal plates is provided on each upper and lower end with a hook-like latch portion, and said hook-like latch portion is hooked on each upper and lower end edges of said box to attach said terminal plate to said box.

* * * * *